(12) United States Patent
Kim et al.

(10) Patent No.: US 9,221,698 B2
(45) Date of Patent: Dec. 29, 2015

(54) HYBRID ARTIFICIAL WETLAND WATER PURIFICATION SYSTEM, SEWAGE TREATMENT DEVICE USING SAME, AND NATURAL NONPOINT PURIFICATION DEVICE CAPABLE OF SIMULTANEOUSLY PURIFYING RIVER AND LAKE WATER

(75) Inventors: Sung Chul Kim, Gyeongsangnam-do (KR); Gwang Ju Cho, Gyeongsangnam-do (KR); Goo Hyeon Park, Gyeongsangnam-do (KR); Moon Sik Hyun, Seoul (KR); Hee Jin Yang, Seoul (KR); Seol Hee Han, Gyeonggi-do (KR)

(73) Assignees: SUNG IL EN-TECH CO., LTD., Gyeongsangnam-Do (KR); KORBI CO., LTD., Seoul (KR)

( * ) Notice: Subject to any disclaimer, the term of this patent is extended or adjusted under 35 U.S.C. 154(b) by 221 days.

(21) Appl. No.: 14/119,863

(22) PCT Filed: Nov. 30, 2011

(86) PCT No.: PCT/KR2011/009226
§ 371 (c)(1),
(2), (4) Date: Nov. 23, 2013

(87) PCT Pub. No.: WO2012/161392
PCT Pub. Date: Nov. 29, 2012

(65) Prior Publication Data
US 2014/0124420 A1    May 8, 2014

(30) Foreign Application Priority Data

May 24, 2011 (KR) .................. 10-2011-0049235
May 24, 2011 (KR) .................. 10-2011-0049236
May 25, 2011 (KR) .................. 10-2011-0049374

(51) Int. Cl.
*C02F 3/30* (2006.01)
*C02F 3/32* (2006.01)
(Continued)

(52) U.S. Cl.
CPC . *C02F 3/30* (2013.01); *C02F 3/327* (2013.01); *E03F 5/103* (2013.01); *C02F 1/32* (2013.01);
(Continued)

(58) Field of Classification Search
CPC ............... C02F 3/06; C02F 3/30; C02F 3/32; C02F 3/327; C02F 2103/001; E03F 1/001; E03F 5/103; Y02W 10/18
USPC .................. 210/150, 151, 170.03, 602, 747.3
See application file for complete search history.

(56) References Cited

U.S. PATENT DOCUMENTS 4,333,837 A * 6/1982 Plosz ...................... C02F 3/327
                                                          210/602
5,174,897 A * 12/1992 Wengrzynek ........... C02F 3/327
                                                          210/602
(Continued)

FOREIGN PATENT DOCUMENTS

JP        2006-150351 A      6/2006
KR        10-0375237 B1      2/2003
(Continued)

OTHER PUBLICATIONS

International Search Report for PCT/KR2011/009226, Jul. 24, 2012.

*Primary Examiner* — Christopher Upton
(74) *Attorney, Agent, or Firm* — The PL Law Group, PLLC

(57) ABSTRACT

A water quality purification system for a hybrid artificial wetland includes a first aerobic artificial wetland, an anaerobic artificial wetland, and a second aerobic artificial wetland. Here, the first aerobic artificial wetland induces a vertical flow of water, which is to be purified, and allows pollutants to be removed. The anaerobic artificial wetland induces a horizontal flow of treated water which is introduced from the first aerobic artificial wetland, and allows pollutants to be further removed. Additionally, the second aerobic artificial wetland induces a vertical flow of treated water which is introduced from the anaerobic artificial wetland, and allows air to be supplied inwardly such that the amount of dissolved oxygen of the introduced treated water increases.

14 Claims, 12 Drawing Sheets

(51) Int. Cl.
*E03F 5/10* (2006.01)
*C02F 1/32* (2006.01)
*C02F 1/52* (2006.01)
*C02F 103/00* (2006.01)
*C02F 3/20* (2006.01)

(52) U.S. Cl.
CPC ............... *C02F 1/5245* (2013.01); *C02F 3/201* (2013.01); *C02F 2103/001* (2013.01); *C02F 2209/005* (2013.01); *C02F 2209/02* (2013.01); *C02F 2209/08* (2013.01); *C02F 2209/11* (2013.01); *C02F 2209/40* (2013.01); *Y02W 10/15* (2015.05); *Y02W 10/18* (2015.05)

(56) References Cited

U.S. PATENT DOCUMENTS

| | | | |
|---|---|---|---|
| 7,718,063 B2 * | 5/2010 | Jacquet | C02F 3/327 210/602 |
| 2003/0111409 A1 * | 6/2003 | Austin | C02F 3/06 210/602 |
| 2008/0251448 A1 * | 10/2008 | Kent | C02F 3/327 210/602 |
| 2009/0230057 A1 * | 9/2009 | Dautais et al. | C02F 3/06 210/150 |
| 2009/0255862 A1 * | 10/2009 | Harrison | C02F 3/327 210/167.31 |
| 2009/0261026 A1 * | 10/2009 | Grewal | C02F 3/327 210/151 |
| 2010/0059438 A1 * | 3/2010 | Bottcher | C02F 3/32 210/150 |
| 2013/0105387 A1 * | 5/2013 | Antoinette | C02F 3/327 210/602 |

FOREIGN PATENT DOCUMENTS

| | | |
|---|---|---|
| KR | 10-1006170 B1 | 1/2011 |
| KR | 10-1030690 B1 | 4/2011 |
| KR | 10-1030860 B1 | 4/2011 |

* cited by examiner

HYBRID ARTIFICIAL WETLAND WATER PURIFICATION SYSTEM, SEWAGE TREATMENT DEVICE USING SAME, AND NATURAL NONPOINT PURIFICATION DEVICE CAPABLE OF SIMULTANEOUSLY PURIFYING RIVER AND LAKE WATER

CROSS REFERENCE TO RELATED APPLICATIONS AND CLAIM OF PRIORITY

This patent application is a National Phase application under 35 U.S.C. §371 of International Application No. PCT/KR2011/009226, filed 30 Nov. 2011, which claims priority to Korean Patent Application Nos. 10-2011-0049235 filed 24 May 2011, 10-2011-0049236 filed 24 May 2011, and 10-2011-0049374 filed 25 May 2011, entire contents of which are incorporated herein by reference.

BACKGROUND

1. Field of the Invention

The present invention relates to a hybrid artificial wetland water purification system, and a sewage treatment device using the same, and a natural nonpoint purification device capable of simultaneously purifying river and lake water, and more particularly, to a low energy consumption-type multi-functional water quality purification system for a hybrid artificial wetland, and a sewage treatment device using the same, and a natural nonpoint purification device capable of simultaneously purifying river and lake water, wherein the invention can selectively or simultaneously treat nonpoint pollution sources, which leak out while raining, in an advanced manner when being applied to treat point pollution sources, such as sewage or waste water, or treating various pollutants that are contained in streams or lakes.

2. Description of the Related Art

In general, sources of water pollution are largely classified into point pollution sources and nonpoint pollution sources according to their prevention and management.

Point pollution sources refer to pollution sources that discharge contaminated water, such as sewage, factory wastewater, or livestock wastewater, in a specific position.

Nonpoint pollution sources are discharge sources that discharge water pollutants at unspecific locations, such as the ground, a road, a farmland, a mountain area, or a construction site. Pollutants contained in the water that originates from rainwater and passes through a cultivation land, a ranch, a metro area, a forest area, a parking lot, a road, various construction areas, factory and industrial regions or from water which permeates underground, are main examples of nonpoint pollution sources.

Until now, various technologies have been applied to purify point and nonpoint water pollution sources. Among the various technologies, artificial wetland water purification systems have advantageous economic effects with respect to construction and maintenance costs, allowing comparatively stable water purification systems. Furthermore, low energy consumption and convenient operation of these purification facilities, permits wider applicability of these water purification systems.

However, artificial wetland purification technologies according to the conventional art, use a vertical or horizontal flow of artificial wetland utilizing a single reactor tank. Therefore, it is difficult to treat high-concentration pollutants and eutrophication materials, such as nitrogen and phosphorus, with high efficiency, and treatment efficiency may vary greatly according to changes in flow rates or water quality, thereby limiting existing natural purification technologies.

Furthermore, in artificial wetland purification technology, a site area of generally 10 to 30 $m^2/m^3 \cdot IL$ or more should be treated, depending on different types of pollution sources. As a result, this has been recognized as the largest disadvantage, in spite of the myriad advantages.

A mechanical, device-type, and facility-oriented treatment method has mainly been applied to the treatment of point pollution sources. This method employs highly trained professional manpower that resides on-site and requires continuous management. A technology that can replace this high energy and high consumption-type treatment method has been desired because the maintenance thereof is very difficult, and management costs are very high.

Therefore, high-concentration and high-efficiency inlet water treatment problems that cannot be solved by natural purification technologies need to be solved, and the development of natural-type purification technologies, whereby the treatment of nitrogen and phosphorous, which are the causes of eutrophication, is required.

Nonpoint pollution sources have the following characteristics: the generation of the pollutant is both artificial and natural, the pollutant discharge location is nonspecific, the pollutants are diluted, dispersed, and discharged over wide regions, and the prediction of the pollutant is difficult, the collection of the pollutant is difficult, treatment efficiencies are no uniform, and the design, application, and management of the current purification facilities are difficult.

These nonpoint pollution sources may be deposited into precipitation soils and sand that absorb most of the rainwater leakage and nutritive substances that cause eutrophication, such as nitrogen and phosphorous, oils, and heavy metals, which are critical to aquatic organisms in small amounts, organic substances, and poisonous substances, which are critical to aquatic organisms, such as agricultural pesticides, various bacteria, and viruses, and inert materials, all of which can be swept up and discarded as garbage at industrial sites. The frequency and discharge amount of these nonpoint pollution sources and materials greatly depends on the weather conditions, such as rain.

Meanwhile, methods of controlling nonpoint pollution sources according to the related art have been classified into physical methods, whereby various treatment facilities and structures are installed to control nonpoint pollution sources, and methods of applying nonphysical techniques, such as soil usage regulation, have also been used.

With respect to the physical methods mentioned above, there are permeation-types and device-types that require excess management, detention-types, such as free flow-type artificial wetlands and detention ponds wherein removal of the pollutants depends on the precipitation and detention, vegetation-types, such as vegetation filter strips or a vegetation waterways, sewage treatment-types, such as super high-speed agglomerating and precipitation facilities, and combined contact oxidation facilities which are installed at riverfronts or within rivers.

However, in each of the mentioned prior art examples, the initial investment costs are relatively high compared to nonpoint pollution source purification capabilities, and there may be difficulties associated with maintenance.

In addition, it may be difficult to apply the nonphysical techniques mentioned above because the purification efficiencies are low and there is the possibility of civil complaints.

Since treatment processes like the latter case are limited to physical treatment methods, such as precipitation or filtering, the performance of removing nonpoint pollutants, including nutrient salts including N and P, may be lowered.

Furthermore, the removal of suspensions, organic substances, and nutrient salts contained in the contaminated water depends on the filtering and absorption capabilities of the treatment plant. Thus, there may be limitations in maintaining the continuous performance according to different regions and seasonal times.

By using a simple filtering system employing an underwater medium layer consisting of gravel and rubble, management of the medium layer may be minimal or the performance of removing the nutrient salts may be low.

In the past, water purification policies for treating point pollution sources have been enforced in an effort to manage and reduce pollutants. However, as the standard of living is improved and the urbanization of more land increases, the impermeability of these regions increases, thereby changing the rain discharge characteristics, subsequently allowing large amounts of various pollutants to leak into the water system and cause lower water quality. Thus, a counterplan is required wherein nonpoint pollution sources, including rainwater discharge, need to be actively controlled to improve the water quality of rivers and lakes compromised by nonpoint pollution sources.

In particular, if nonpoint pollutants flow into surface or underground water, it is difficult to directly remove these pollutants, and since the costs for treating nonpoint pollution sources increase as the purification facility gets farther away from the pollution sources, the development of a purification system and a purification facility, both having excellent purification capabilities and being located where the nonpoint pollutants are generated, is urgently needed.

In addition, since the monitoring and operation of flow rates and water quality cannot be realized, problems associated with the management of the current purification facilities will arise, therefore, there is a need for new technologies for operating systems capable of easily managing and achieving effective operating objectives and low costs.

Furthermore, there is a need for the development of a purification system capable of purifying nonpoint contaminated water caused by rainwater. This new purification system also needs to be capable of purifying rivers or lakes. This system would be very useful for establishing clean water reservoirs, especially during drought seasons.

SUMMARY

The present invention is directed to providing a hybrid artificial wetland water purification system in which a high-degree of treatment can be performed in that a particular pollution source can be controlled using a general and natural purification technology. This includes the artificial wetland having the capability of performing existing simple purifications.

The present invention is also directed to providing a hybrid artificial wetland water purification system in which aerobic and anaerobic regions are distinguished according to the supply of air. Each unit process is performed using a flow manner that is optimum for the treatment of organic substances, nitrogen, and phosphorus. The vertical and horizontal orientation of the flow of wetland has different characteristics in removing pollutants, and there is a large difference between residence times.

The present invention is also directed to providing a hybrid artificial wetland water purification system in which a pretreatment facility is to be applied according to the type and concentration of the pollutants to be treated, and the appropriate residence times for each reactor tank are set so that standardized media is used. Also, a feedback line in which a predetermined amount of treated water in each unit process is re-circulated, is provided as needed.

The present invention is also directed to providing a hybrid artificial wetland water purification system in which a hybrid-type artificial wetland is configured in such a way that each artificial wetland reactor tank is combined according to its specific operation, and each reactor tank is functionalized from a single reactor tank type artificial wetland according to the related art, such that high-efficiency pollutant treatment can be performed, and in which optimum efficiency in treatment of pollutants can be shown.

The present invention is also directed to providing a high-efficiency hybrid artificial wetland water purification system wherein pore blocking in an artificial wetland caused by particle materials from a point pollution source, such as sewage or wastewater that has comparatively high contamination concentrations and in which large amounts of solid material is contained, can be prevented. A precipitation separator wherein at least two precipitation chamber stages or more are provided and are installed so that the hybrid artificial wetland water purification system can be stably used for extended periods of time. Also, a first aerobic artificial wetland, an anaerobic artificial wetland, and a second aerobic artificial wetland that are sequentially installed and selectively operated are provided.

The present invention is also directed to providing a hybrid artificial wetland water purification system including a detention pond and a filtering tank in which nonpoint pollutants are effectively treated as high-concentration particle materials, and a nonpoint pollution source, for example, initial rainwater discharge that is detained, and a first aerobic artificial wetland, an anaerobic artificial wetland, and a second aerobic artificial wetland that are sequentially provided at a rear end of the hybrid artificial wetland water purification system.

The present invention is also directed to providing a hybrid artificial wetland water purification system having an information technology (IT) real-time control device, the device being installed at an additional detention pond and at an additional filtering tank that are both capable of increasing the precipitation efficiency of nonpoint pollutants, attenuating shock loads, measuring and transmitting flow rates, measuring and transmitting the quality of each of the introduced water and the discharged water in real time so as to control the introduction of the nonpoint pollutants, including the flow rate and quality of rain discharge water and the control of the discharge and return of the treated water.

The present invention is also directed to providing a hybrid artificial wetland water purification system in which nonpoint contaminated rainwater can be purified and rivers or lakes can also be simultaneously purified.

One aspect of the present invention provides a hybrid artificial wetland water purification system including: a first aerobic artificial wetland that induces a vertical flow of introduced water; an anaerobic artificial wetland that induces a horizontal flow of treated water from the first aerobic artificial wetland; and a second aerobic artificial wetland that induces a vertical flow of treated water from the anaerobic artificial wetland, and allows air to be supplied inwardly to increase the dissolved oxygen in the treated water.

The first aerobic artificial wetland may include: a first filtering layer including an aggregate stacked from a bottom surface and blocked so that water leakage is prevented, and a first medium provided on an upper part of the aggregate; a first reed chip layer provided on an upper part of the first filtering layer; a first distribution device that allows treated water to be uniformly dispersed onto an upper part of the first reed chip layer; a first air introduction tube that allows air to be introduced onto the first filtering layer; and a first air supply unit that is connected to one end of the first air introduction tube and allows introduced air to be dispersed into an inner side of the first filtering layer.

The first air introduction tube may be provided in a vertical direction and may allow atmospheric air to be introduced into a top end of the first air introduction tube, the atmospheric air then moves to a lower side of the first air introduction tube and is discharged to a bottom end of the first air introduction tube. The first air supply unit may be disposed on the first filtering layer in a horizontal direction, and a connection hole formed on an upper part of the first air supply unit may be connected to a bottom end of the first air introduction tube. The first air supply unit may include a plurality of tunnel-type perforated drainpipes each having an outer surface wherein holes are formed so that air introduced from the first air introduction tube is capable of being supplied to the first filtering layer.

The plurality of tunnel-type perforated drainpipes may be disposed on a bottom surface of the first filtering layer, may guide inner space parts to communicate with each other, and may guide treated water to move. Also, a plurality of first air introduction tubes may be provided and spaced apart from each other by a predetermined distance.

The anaerobic artificial wetland may include: a second filtering layer that is provided on a bottom surface from which water is blocked thereby preventing water leakage, wherein a first aggregate part, a second aggregate part, and a third aggregate part are sequentially provided from the front to the rear, along a flow direction of treated water, and the sizes of the aggregates being large; and a second medium installed at an upper part of the second filtering layer.

The second aerobic artificial wetland may include: a third filtering layer including aggregate stacked from a bottom surface from which water is blocked thereby preventing water leakage and a third medium provided at an upper part of the aggregate; a second reed chip layer provided at an upper part of the third filtering layer; a second distribution device that allows treated water to be supplied when water to be purified is treated, and allows treated water to be uniformly dispersed into an upper part of the second reed chip layer; a second air introduction tube that allows air to be introduced into the third filtering layer; and a second air supply unit that is connected to one end of the second air introduction tube and allows introduced air to be dispersed into an inner side of the third filtering layer.

The second air introduction tube may be provided in a vertical direction and may allow atmospheric air to be introduced into a top end of the second air introduction tube, the atmospheric air being allowed to move to a lower side of the first air introduction tube, and discharged to a bottom end of the second air introduction tube. The second air supply unit may be disposed on the third filtering layer in a horizontal direction, and a connection hole formed in an upper part of the second air supply unit may be connected to a bottom end of the second air introduction tube; the second air supply unit may include a plurality of tunnel type perforated drainpipes each having an outer surface in which holes are formed, so that air introduced from the second air introduction tube is capable of being supplied to the third filtering layer.

The plurality of tunnel type perforated drainpipes may be disposed on a bottom surface of the third filtering layer, and may guide inner space parts to communicate with each other, they may also guide treated water to move; a plurality of second air introduction tubes may be provided to be spaced apart from each other by a predetermined distance.

Another aspect of the present invention provides a sewage treatment device including: a water-collecting tank including a screen tank in which water to be purified is collected. Objects to be purified that pass through a screen and that exists in sewage are filtered. A precipitation tank, which is connected to one side of the screen tank, is used to purify objects that exits in the water, previously filtered in the screen tank, to be purified via precipitation; a hybrid artificial wetland water purification system as in one of the claims 1 through 8 provided is used to treat treated water discharged from the water-collecting tank; and a discharge tank disposed at one side of a second aerobic artificial wetland of the hybrid artificial wetland water purification system, in which treated water purified through the second aerobic artificial wetland is collected and the collected, treated water is discharged to the outside.

Still another aspect of the present invention provides a natural nonpoint purification device capable of simultaneously purifying water from rivers and lakes, including: a detention pond, configured as either one of a structure installed under the ground and a pond, which has an outer surface on which a water-blocking layer is provided thereby preventing water leakage, and in which water to be purified introduced through an introduction water door provided at an inlet and operating according to a first measurement value, is detained; a pretreatment unit in which treated water in the detention pond is introduced and pretreated; a hybrid artificial wetland water purification system as in one of claims 1 through 8 provided is used to treat pre-treated water discharged from the pretreatment unit; and a control device that obtains a first measurement value of water to be purified introduced into the detention pond in real time, controls an inflow amount of the water to be purified in real time, obtains a second measurement value of the treated water that is finally discharged from the second aerobic artificial wetland in real time, and controls a discharge amount of the treated water in real time.

The detention pond may be installed to detain 0.5 to 1.0 Q of predicted nonpoint initial rain, wherein Q (nonpoint pollution amount generated by initial rain, $m^3$) is defined as a nonpoint pollution source occurrence basin area (A, $m^2$)×rain intensity (I, mm).

The pretreatment unit may include a filtering tank, an agitating tank, an agglomerating tank, a precipitation tank, and a pretreatment water tank, which are sequentially provided along a flow direction of treated water supplied from the detention pond, and the filtering tank may include: a housing that constitutes an exterior and that is watertight treated; a packing box including an accommodation part in which a plant filtering member is filled, and a cover part that opens and closes an upper part of the accommodation part, wherein the packing box is detached from an inner side of the housing; and a distribution pipe, which is provided at an upper side of the packing box and has an outer surface in which a plurality of perforating holes are formed and treated water transferred from the detention pond is distributed toward the packing box through the plurality of perforating holes.

At the detention pond, a first transfer pipe, in which nonpoint contaminated rainwater is guided to the distribution pipe and allowed to move sequentially along the filtering tank, the agitating tank, the agglomerating tank, the precipitation tank, and the pretreatment water tank, and a direct guide pipe that guides introduced water to move directly to the pretreatment water tank, may be connected to each other.

The second aerobic artificial wetland may further include a discharge pipe that guides discharged, treated water to be discharged toward rivers or lakes.

In a hybrid artificial wetland water purification system, a sewage treatment device using the same, and a natural nonpoint purification device capable of simultaneously purifying river and lake water according to an embodiment of the present invention, an air supply unit is widely provided on the bottom of a first aerobic artificial wetland and on the bottom of a second aerobic artificial wetland whereby the air supply unit smoothly supplies sufficient air to a filtering layer so that air can be stably supplied to an aerobic microorganism whereby an oxidation decomposition rate of a floating organic solid material, caused by the aerobic microorganism, can be remarkably improved.

According to an embodiment of the present invention, reed, wanggorengyi, carex dispalta Boott, and Iris pseudoacorus are planted on a top surface of an artificial wetland so that sewage can be treated in an environmentally conscious fashion, and simultaneously, landscape effects within a public facility and apartment housing can be realized.

In a natural nonpoint purification device capable of simultaneously purifying river and lake water using a hybrid artificial wetland water purification system, according to another embodiment of the present invention, a detention pond, wherein 0.5 to 1.0 Q of a predicted initial rain nonpoint occurrence amount can be detained, is provided so that the majority of the nonpoint contaminated water having a high contamination degree can be detained and precipitated, as well as floating material, inert matter, oily, and suspension solid materials can be stably removed from nonpoint pollutants of introduced nonpoint contaminated water and a shock load can be attenuated.

According to another embodiment of the present invention, a packing box is detachably provided at an inner side of a filtering tank, and a reed chip is filled as a filtering material at an inner side of the packing box so that their replacement can be easily performed and additional removal of oil, soil, and sand contained in the treated water can be effectively performed.

According to another embodiment of the present invention, the control device measures and analyzes, in real time, the quality and flow rate of water introduced into the detention pond to be purified and the quality and flow rate of the treated water. Thus, introduction of water to be purified and discharge of the treated water are controlled such that introduced water is prevented from being unnecessarily introduced in advance and treated water can be selectively circulated so that more effective operations can be performed.

According to another embodiment of the present invention, a treatment process caused by an aerobic artificial wetland and an anaerobic artificial wetland is applied as a main treatment process so that convenient management is increased and maintenance costs are reduced. Also, construction can be performed in various positions so that water pollutants can be prevented from directly flowing into a neighboring water system in an unspecific place, and the water pollutants are stably purified so that a separate water supply source or river is prevented from being contaminated.

According to another embodiment of the present invention, during a drought, treated and discharged water is circulated to the detention pond and thus can be utilized as water for landscaping or for watering vegetation, and whereby the detention pond functions as an ecology wetland park.

According to another embodiment of the present invention, nonpoint contaminated water caused by rain during the summer rain season is purified, and rivers and lakes during the drought can be selectively or simultaneously purified, thereby improving their availability.

According to another embodiment of the present invention, during fine weather and rain, the entire operation of a pretreatment unit can be performed according to a change in water quality (i.e., when water quality is deteriorated, and medicine injections and sterilization processes are further added so that water quality can be improved).

DETAILED DESCRIPTION

Hereinafter, exemplary embodiments of the present invention in which the above-described technical aspects may be specifically implemented, will be described in detail with reference to the attached drawings.

Figure 1:
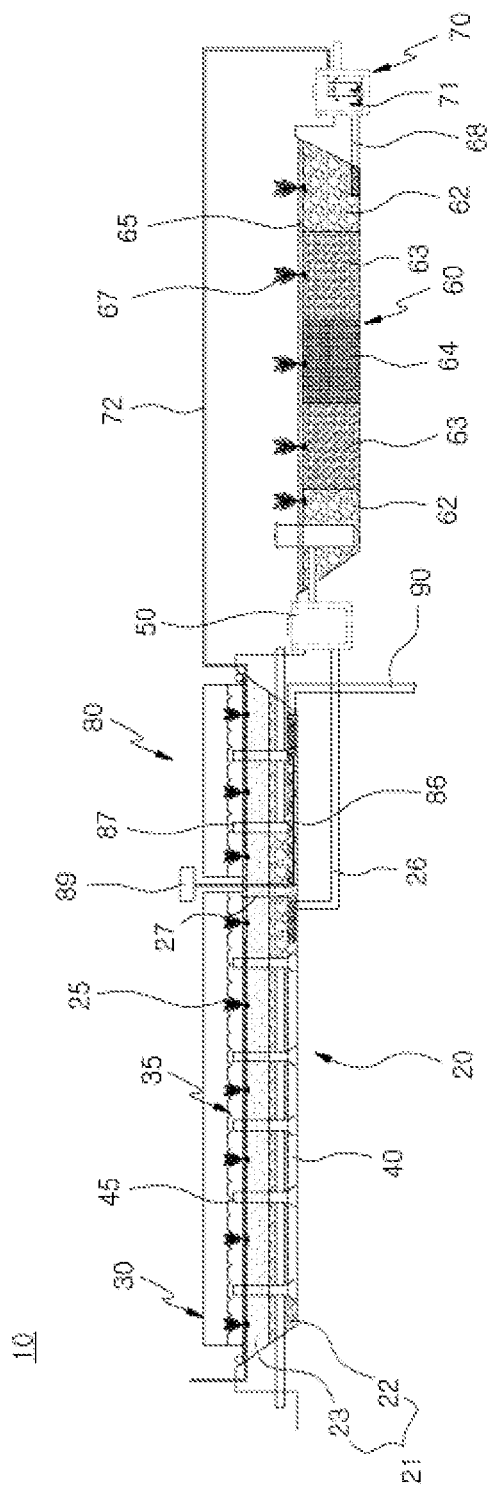
FIG. 1 is a cross-sectional view illustrating a hybrid artificial wetland water purification system according to a first exemplary embodiment of the present invention.
Figure 2:
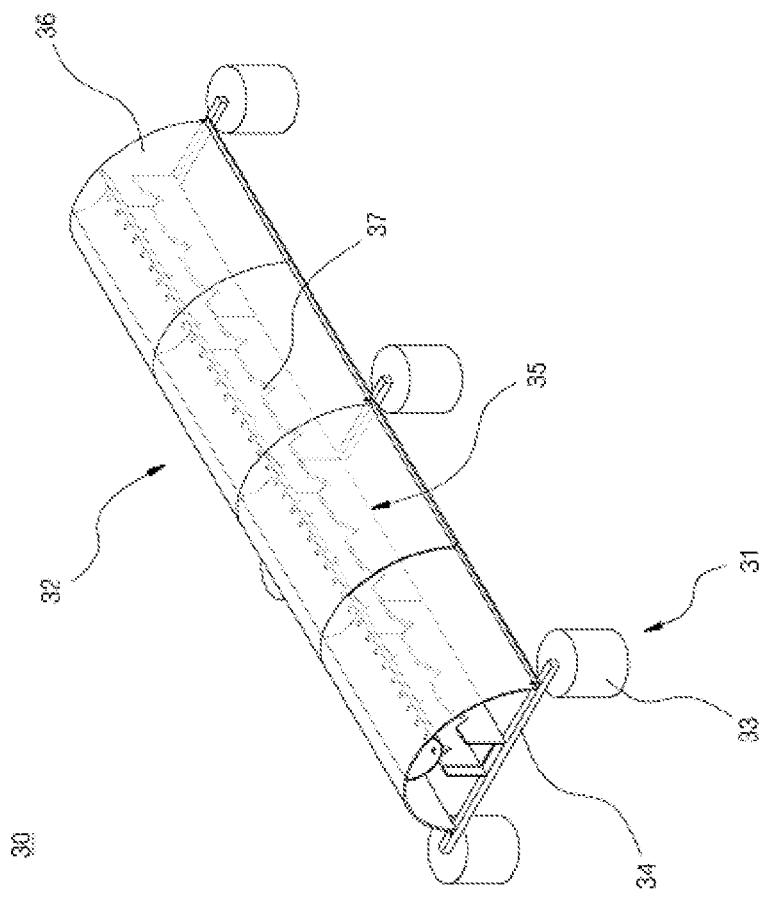
FIG. 2 is a perspective view of a first distribution device of a first aerobic artificial wetland of the hybrid artificial wetland water purification system illustrated in FIG. 1.
Figure 3:
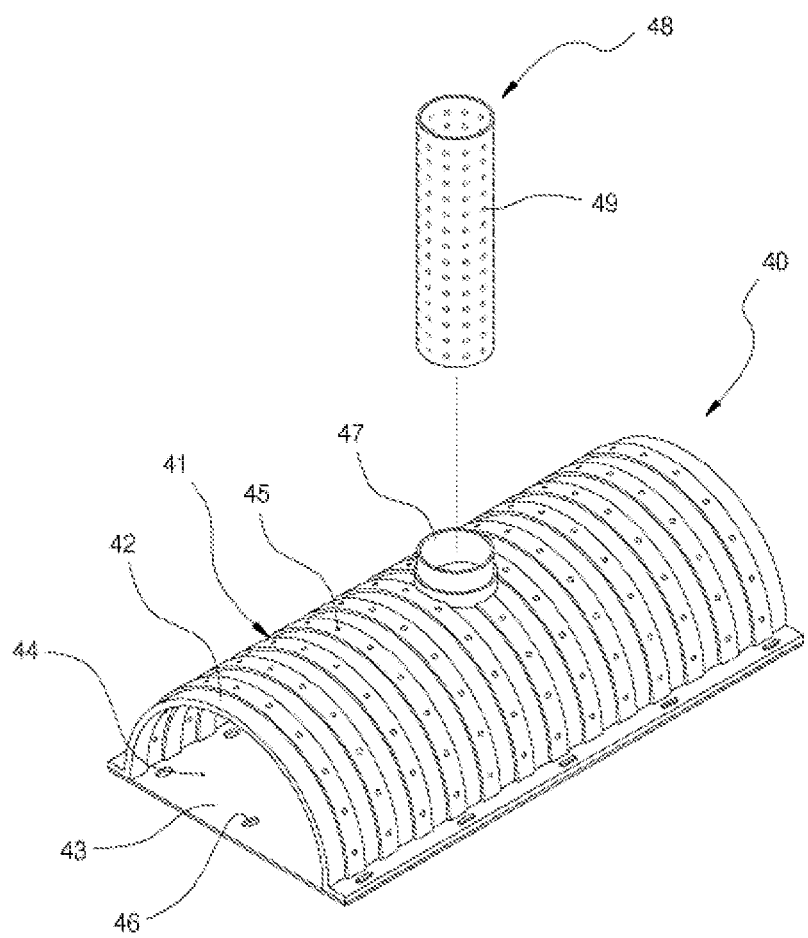
FIG. 3 is a perspective view of an air introduction tube and an air supply unit of the first aerobic artificial wetland of the hybrid artificial wetland water purification system of FIG. 1.
Figure 4:
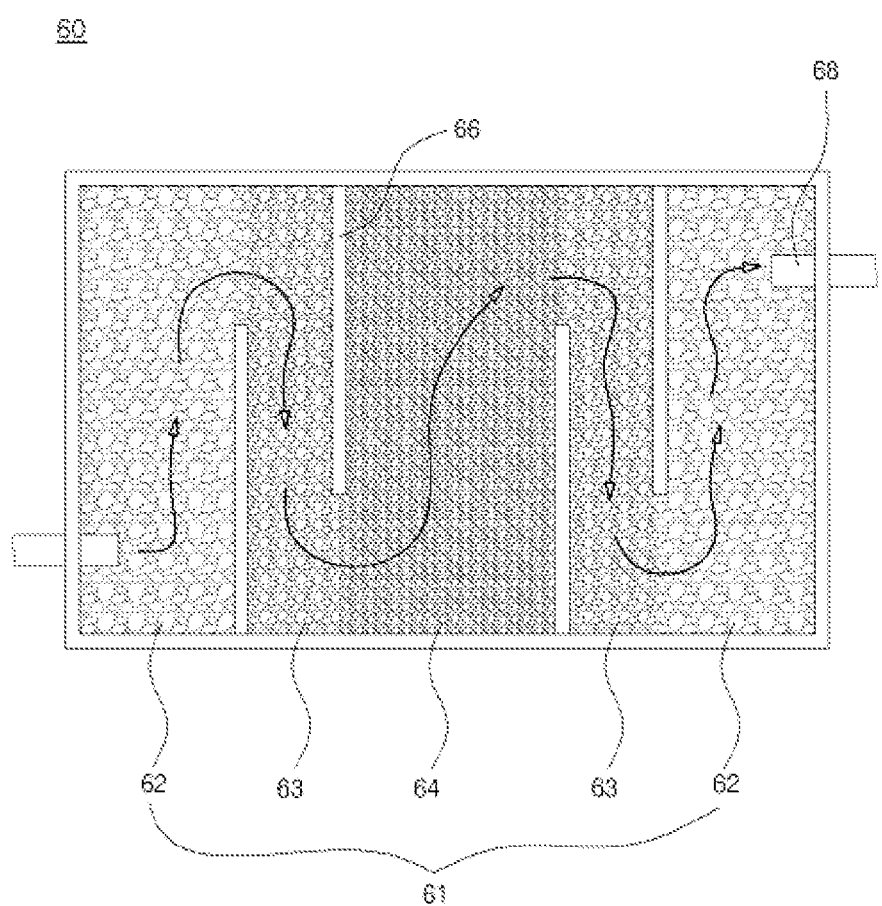
FIG. 4 is a plan view illustrating a first aerobic artificial wetland of the hybrid artificial wetland water purification system of FIG. 1.
Figure 5:
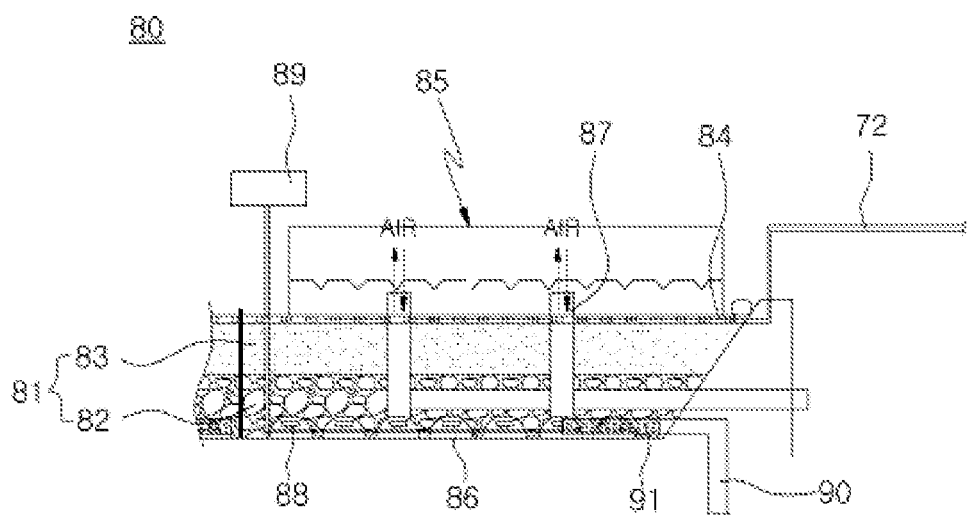
FIG. 5 is a cross-sectional view illustrating a second aerobic artificial wetland of the hybrid artificial wetland water purification system illustrated in FIG. 1.

FIG. 1 is a cross-sectional view illustrating a hybrid artificial wetland water purification system according to a first exemplary embodiment of the present invention; FIG. 2 is a perspective view of a first distribution device of a first aerobic artificial wetland of the hybrid artificial wetland water purification system illustrated in FIG. 1; FIG. 3 is a perspective view of an air introduction tube and an air supply unit of the first aerobic artificial wetland of the hybrid artificial wetland water purification system of FIG. 1; FIG. 4 is a plan view illustrating a first aerobic artificial wetland of the hybrid artificial wetland water purification system of FIG. 1; and FIG. 5 is a cross-sectional view illustrating a second aerobic artificial wetland of the hybrid artificial wetland water purification system illustrated in FIG. 1.

As illustrated in FIGS. 1 through 5, a hybrid artificial wetland water purification system 10 may include a first aerobic artificial wetland 20, an anaerobic artificial wetland 60, and a second aerobic artificial wetland 80. Here, the first aerobic artificial wetland 20 induces a vertical flow of water, which is to be purified, and allows pollutants to be removed. The anaerobic artificial wetland 60 induces a horizontal flow of treated water introduced from the first aerobic artificial wetland 20 and allows pollutants to be additionally removed. Also, the second aerobic artificial wetland 80 allows the amount of dissolved oxygen in the treated water introduced from the anaerobic artificial wetland 60 to increase.

In further detail, the first aerobic artificial wetland 20 may be configured to include a first filtering layer 21, a first distribution device 30, a first air introduction tube 48, and a first air supply unit 40.

The first filtering layer 21 may be configured to include aggregate 22 stacked from the bottom surface blocked so that water leakage can be prevented, and a first medium 24 provided at an upper part of the aggregate 22.

Also, a first plant 25 may be planted on the first medium 24, and reeds or the like may be provided as the first plant 25.

A plurality of first distribution devices 30 may be horizontally provided on an upper side of the first filtering layer 21. The plurality of first distribution devices 30 allow supplied water to be uniformly dispersed and purified corresponding to an area on a top surface of the first aerobic artificial wetland 20.

Here, the plurality of first distribution devices 30 may be provided at regular intervals in a lengthwise direction of each of the plurality of first distribution devices 30 with respect to the area on the top surface of the first aerobic artificial wetland 20.

Each of the first distribution devices 30 includes a support part 31 and a cover part 32.

Also, the support part 31 includes supports 33 spaced apart from each other by a predetermined gap, and holding stacks 34 respectively connected to one side of a top end of the support part 31.

The cover part 32 includes distribution pipes 35 respectively connected to one side of the top end of the support part 31 and a cover 36 that covers the distribution pipes 35.

The distribution pipes 35 are respectively connected to one side of a top end of each of the holding stacks 34 spaced apart from each other by a predetermined gap. Each of the distribution pipes 35 has a shape of a rectangular pipe having an open upper part so as to provide a flow path on which introduced water to be purified flows.

Distribution pipes 35 may include V-shaped discharge parts 37, disposed at both sides of the distribution pipes 35, to be spaced apart from each other by a predetermined gap so that water to be purified can be uniformly dispersed onto the top surface of the first aerobic artificial wetland 20.

The first air supply unit 40 is disposed on the first filtering layer 21, and the first air supply unit 40 includes a plurality of tunnel-type perforated drainpipes 41.

The plurality of tunnel-type perforated drainpipes 41 are configured in such a way that an upper plate 42 and a lower plate 43 are coupled to each other and inner space parts 44 are formed inside the tunnel-type perforated drainpipes 41 so that a fluid, such as water, and air can flow in the inner space parts 44.

Through holes 45 and 46 are formed in the upper plate 42 and the lower plate 43 so that water and air can be introduced into and discharged from the tunnel type perforated drainpipes 41.

Also, a connection hole 47 is formed in the upper plate 42, and the first air introduction tube 48 is connected to the connection hole 47.

A top end of the first air introduction tube 48 passes through the first filtering layer 21 and protrudes upwardly, and a plurality of through holes 49 are formed in a surface of the first air introduction tube 48.

Thus, atmospheric air may be introduced into the first air introduction tube 48 through the plurality of through holes 49, and the introduced air may move to the first air supply unit 40 and may be supplied into the first filtering layer 21.

In this case, a cover (not shown) may be further provided on the top end of the first air introduction tube 48 so that a substance, such as dust, may not be introduced into the first air introduction tube 48. In this case, various types of covers formed of a fabric such as a nonwoven fabric or metal or plastic having a ventilation hole formed therein may be used as the cover.

An aerobic microorganism is parasitic on the first medium 23 and the aggregate 22, and purification may be performed on introduced water to be purified. Air that is introduced through the first air introduction tube 48 is supplied to the aerobic organism through the first air supply unit 40 so that a vigorous decomposition action of the aerobic microorganism can be performed.

The first air supply unit 40 may be configured to include the plurality of tunnel-type perforated drainpipes 41 disposed in a lattice form on the bottom surface of the first filtering layer 21.

The tunnel type perforated drainpipes 41 may be provided in such a way that the inner space parts 44 communicate with each other. A plurality of first air introduction tubes 48 may be provided and spaced apart from each other by a predetermined gap in a lengthwise direction of the first air supply unit 40.

Also, a horizontal ventilation hole (not shown) may be connected to the connection hole 47. In this case, the first air introduction tube 48 and the horizontal ventilation hole may be sequentially connected to each other.

Treated water discharged from the first aerobic artificial wetland 20 may be supplied to the anaerobic artificial wetland 60 through a first drain 26.

In this case, a first water tank 50 may be further provided between the first aerobic artificial wetland 20 and the anaerobic artificial wetland 60.

In the anaerobic artificial wetland 60, treated water that is pre-purified by the aerobic microorganism may be secondarily purified.

Also, the anaerobic artificial wetland 60 may include a second filtering layer 61 and a second medium 65.

Here, the outermost part, such as the bottom part and the side part of the anaerobic artificial wetland 60, may be formed of a material that may obtain structural stability, such as a concrete structure, fiber reinforced plastic (FRP), polyethylene (PE), or stainless steel.

Also, a water-blocking layer formed of an impermeable material may be further provided at the bottom part and the side part of the anaerobic artificial wetland 60. In this case, the water-blocking layer may be formed of a high-density polyethylene (HDPE) material.

The second filtering layer 61 may be provided at an upper part of the bottom part.

Here, the second filtering layer 61 may be configured in such a way that a first aggregate part 62, a second aggregate part 63, a third aggregate part 64, wherein the second aggregate part 63 and the first aggregate part 62 are sequentially provided from the front to the rear along a horizontal flow direction of the introduced pre-treated water.

In this case, the sizes of the aggregates may be increasingly larger in the order of the first aggregate part 62, the second aggregate part 63, and the third aggregate part 64.

Thus, the second filtering layer 61 is disposed in such a way that aggregates are sequentially laid from the front to the rear, along the horizontal flow direction of the pre-treated water, according to sizes of large to medium to small to medium to large, and the treated water passes through the second filtering layer 61, is dispersed, and is transferred.

When the area of the anaerobic artificial wetland 60 is large and the occurrence of a deflected current of the treated water is a concern, guide partition walls 66 may be further provided that partially partition-off an internal space of the anaerobic artificial wetland 60 and guide the flow of the treated water in a horizontal direction via a zigzag manner.

A second plant 67 may be planted on the second medium 65, wherein reed, wanggorengyi, carex dispalta Boott, and Iris pseudoacorus may be provided as the second plant 67.

In the anaerobic artificial wetland 60, treated water that is pre-purified through the first aerobic artificial wetland 20, is secondarily purified through a parasitic anaerobic microorganism on the second filtering layer 61, and the anaerobic artificial wetland 60 uniformly contacts the entire second medium 65, and the second filtering layer 61 on which the parasitic anaerobic microorganism resides, so that secondary purification efficiency using the anaerobic microorganism can be maximized.

The treated water discharged from the anaerobic artificial wetland 60 may be supplied to the second aerobic artificial wetland 80 through a second drain 68.

In this case, a second water tank 70 may be further disposed between the anaerobic artificial wetland 60 and the second aerobic artificial wetland 80, and a pump 71 may be provided at the second water tank 70.

Also, the treated water of the second water tank 70 may be supplied to the second aerobic artificial wetland 80 through a third drain 72.

The second aerobic artificial wetland 80 may be separated from the first aerobic artificial wetland 20 by a separation wall 27.

The second aerobic artificial wetland 80 may include a third filtering layer 81, a second reed chip layer 84, and a second distribution device 85.

First, the outermost parts, such as the bottom part and the side part of the second aerobic artificial wetland 80, may be formed of a material that may provide structural stability, such as a concrete structure, fiber reinforced plastic (FRP), polyethylene (PE), or stainless steel.

Also, a water-blocking layer formed of an impermeable material may be further provided at the bottom part and the side part of the second aerobic artificial wetland 80. In this case, the water-blocking layer may be formed of a HDPE material.

The third filtering layer 81 may be provided at an upper part of the bottom part.

The third filtering layer 81 may be configured to include an aggregate 82 and a third medium 83. The aggregate 82 and the third medium 83 may be sequentially stacked on the upper part of the bottom part.

In further detail, the aggregate 82 may be configured to include gravel having sizes of 10 to 40 mm or lightweight aggregate and may be stacked with a height of 0.3 to 1.0 m.

The third medium 83 is provided at an upper part of the aggregate 82. The third medium 83 may be configured to include a porous medium having sizes of 2 to 10 mm or a filter sand and may be stacked with a height of 0.3 to 1.2 m.

The aggregate 82 and the third medium 83, from which clay is removed, may be used having a coefficient of uniformity of 3.0 or less, having developed pores, excellent surface roughness, and a large chemical ion exchange capability so that a sticking capability of the microorganism can be improved.

Also, the second reed chip layer 84 may be provided at the upper part of the third filtering layer 81. The second reed chip layer 84 may be formed by stacking reed chips having sizes of 2 to 10 cm to a thickness of 5 cm or more.

The second distribution device 85 may be provided at an upper part of the second reed chip layer 84. The second distribution device 85 may be configured in the same way as that of the above-described first distribution device 30.

The second distribution device 85 uniformly distributes the treated water introduced through the third drain 72 to the upper part of the second reed chip layer 84. A plurality of second distribution devices 85 may be provided according to the area of the second reed chip layer 84.

A third plant (not shown) may be further planted on the second reed chip layer 84. The third plant is not limited to a specific plant.

Thus, the treated water discharged from the second distribution device 85 drops toward the second reed chip layer 84, downwardly flows in a vertical direction and passes through the third medium 83 and the aggregate 82. In this procedure, removal of additional nonpoint pollutants, such as organic substances and nutrient salts, can be performed by physical removal, such as filtering and adsorption, biological removal using microorganisms, and removal of chemical pollutants, via chemical bonding and ion exchange.

Meanwhile, the second aerobic artificial wetland 80 may further include a second air supply unit 86 that is provided in a horizontal direction, allows external air to be introduced, and allows introduced air to be transferred to the entire bottom of the second aerobic artificial wetland 80, and a second air introduction tube 87 having a bottom end connected to the second air supply unit 86 and a top end opened to the air.

The second air supply unit 86 and the second air introduction tube 87 may be configured in the same way as that of the above-described first air supply unit 40 and first air introduction tube 48.

An air supply device 89 may be provided at the second aerobic artificial wetland 80, and an air distribution device 88 for distributing air supplied from the air supply device 89 may be further provided at an inner side of the second air supply unit 86.

Thus, a larger amount of air may be artificially supplied to the second aerobic artificial wetland 80 so that the amount of dissolved oxygen in the introduced treated water that passes through the second aerobic artificial wetland 80 increases, and additional improvements in water quality can be realized.

One end of a discharge pipe 90 may be provided in the vicinity of the bottom part of the second aerobic artificial wetland 80. In this case, a plurality of perforating holes 91 may be formed in one end of the discharge pipe 90 so that the treated water can be introduced.

Thus, a mixed type hybrid artificial wetland water purification system 10 can be configured in which the first aerobic artificial wetland 20, the anaerobic artificial wetland 60, and the second aerobic artificial wetland 80 are sequentially connected to each other.

An environmentally friendly hybrid artificial wetland water purification system 10 including the first aerobic artificial wetland 20 wherein air is environmentally supplied and wherein an aerobic atmosphere is maintained, the anaerobic artificial wetland 60 in which no air is supplied, and the second aerobic artificial wetland 80 in which the amount of dissolved oxygen of the pre-treated water increases, can be provided wherein introduced water sequentially passes through the first aerobic artificial wetland 20, the anaerobic artificial wetland 60, and the second aerobic artificial wetland 80 and organic substances, nitrogen, and phosphorus are simultaneously removed by parasitic microorganisms on the first, second, and third filtering layers 21, 61, and 81, respectively.

Also, as the above-described water treatment process is performed in the hybrid artificial wetland water purification system 10, no electricity is used, resulting in the reduction of consumed energy compared to a water treatment process using electricity.

Figure 6:
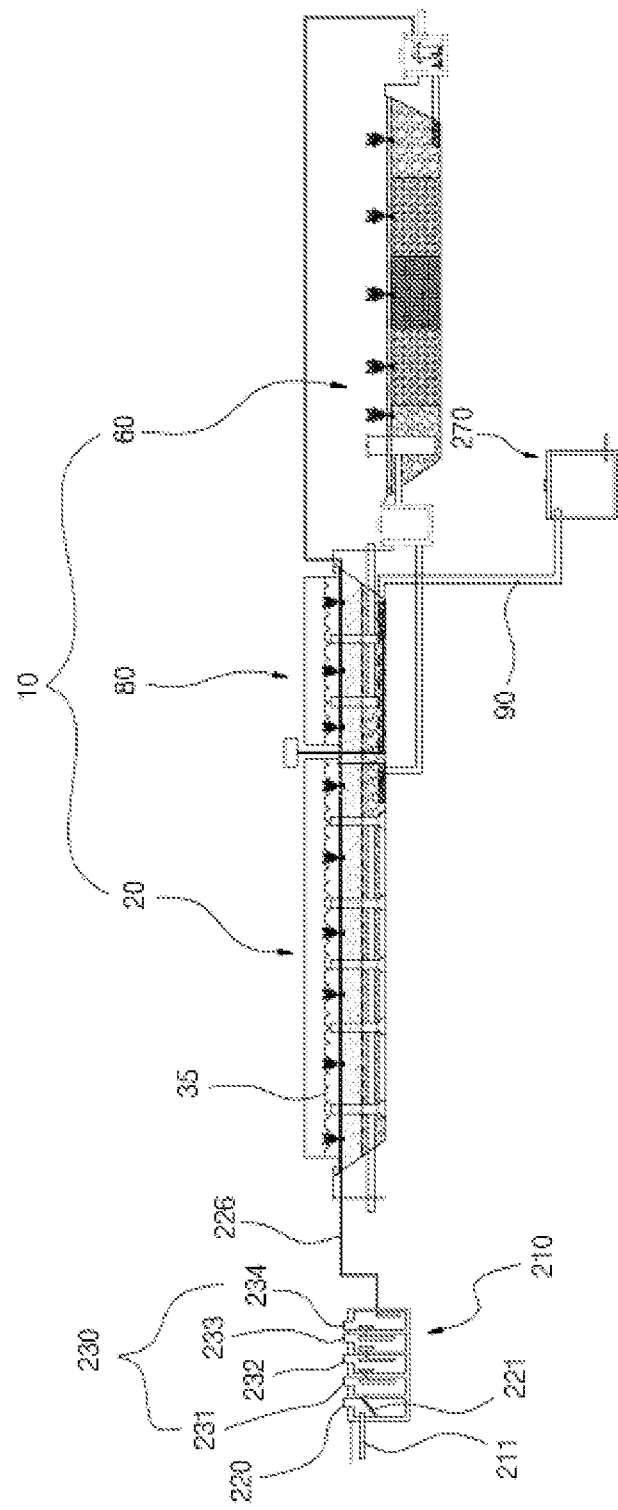
FIG. 6 is a cross-sectional view illustrating a sewage treatment device using a hybrid artificial wetland water purification system according to a second exemplary embodiment of the present invention.

FIG. 6 is a cross-sectional view illustrating a sewage treatment device using a hybrid artificial wetland water purification system according to a second exemplary embodiment of the present invention.

As illustrated in FIG. 6, the sewage treatment device may be a device for treating public sewage. To this end, the sewage treatment device may include a water-collecting tank 210, a hybrid artificial wetland water purification system 10, and a discharge tank 270.

The water-collecting tank 210 may include a screen tank 220 wherein sewage is introduced through a sewage introduction pipe 211, and a precipitation tank 230 which is connected to one side of the screen tank 220 and wherein a solid material that pre-exists within the sewage is filtered by a screen 221 of the screen tank 220, is precipitated.

In this case, the screen 221 may be slanted at an inner side of the screen tank 220. A clay inert matter including a clay material, such as a branch, a piece of vinyl or the like, and a solid material that pre-exists in the sewage introduced through the sewage introduction pipe 211, may be filtered by the screen 221.

Also, sewage from which the clay inert matter and the solid material are filtered by the screen tank 220, is introduced into the precipitation tank 230, and the solid material that exists in the introduced sewage is precipitated in the precipitation tank 230, and the treated water treated in this way is transferred to the first aerobic artificial wetland 20.

Here, the precipitation tank 230 may include a first precipitation tank 231, a second precipitation tank 232, a third precipitation tank 233, and a fourth precipitation tank 234, which are provided along the flow direction of the sewage. The precipitation tank 230 includes a plurality of precipitation tanks so that precipitation separation efficiency of the remaining solid material can be maximized.

The precipitation tank 230 may include one or two precipitation tanks in consideration of installation costs.

Also, one side of a sewage transfer pipe 226, that allows sewage to be introduced into the first aerobic artificial wetland 20, is disposed at the fourth precipitation tank 234, and the other side of the sewage transfer pipe 226 may be disposed at a distribution pipe 35 of the first aerobic artificial wetland 20.

In this case, when the fourth precipitation tank 234 is placed in a position lower than the first aerobic artificial wetland 20, a pump (not shown) may be connected to one side of the sewage transfer pipe 226, and sewage via pumping may be transferred to the first aerobic artificial wetland 20.

Of course, the fourth precipitation tank 234 may be installed in-line with the first aerobic artificial wetland 20 or in a position higher than the first aerobic artificial wetland 20. In this case, sewage may be transferred to the first aerobic artificial wetland 20 only via the sewage transfer pipe 211 (226) without using the pump (not shown).

Subsequently, sewage introduced into the hybrid artificial wetland water purification system 10 is treated while passing through the anaerobic artificial wetland 60 and the second aerobic artificial wetland 80, as described above in the first embodiment, and is discharged through the discharge pipe 90.

Figure 7:
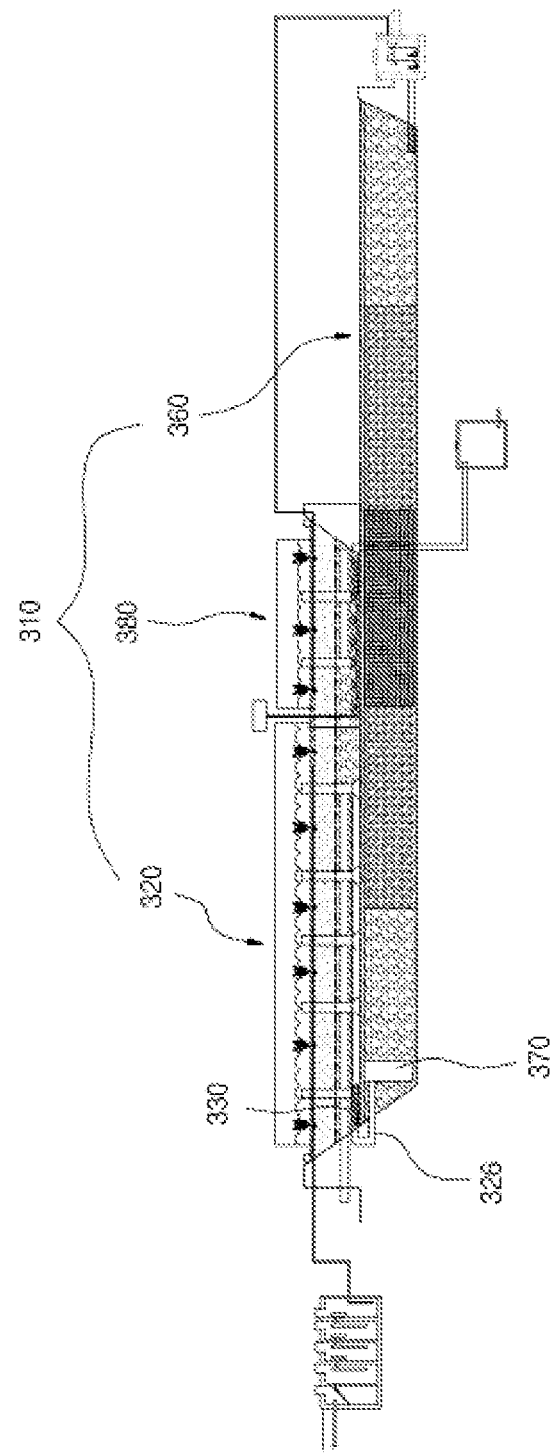
FIG. 7 is a cross-sectional view illustrating a sewage treatment device using a hybrid artificial wetland water purification system according to a third exemplary embodiment of the present invention.

FIG. 7 is a cross-sectional view illustrating a sewage treatment device using a hybrid artificial wetland water purification system according to a third exemplary embodiment of the present invention. In the sewage treatment device according to the current embodiment, an anaerobic artificial wetland may be provided at lower sides of a first aerobic artificial wetland and a second aerobic artificial wetland, and because other configurations of FIG. 7 are substantially the same as those of the second embodiment of the invention as described above, descriptions thereof will be omitted.

As illustrated in FIG. 7, a part of an anaerobic artificial wetland 360 of a hybrid artificial wetland water purification system 310 may be provided at immediately lower sides of the first aerobic artificial wetland 320 and the second aerobic artificial wetland 380.

Thus, the area that the hybrid artificial wetland water purification system 310 is to be installed can be reduced so that the hybrid artificial wetland water purification system 310 can be installed in a place where wide spaces cannot be obtained.

One end of a first drain 326 may be provided in the vicinity of the bottom part of the first aerobic artificial wetland 320. In this case, a plurality of perforated holes 330 may be formed in one end of the first drain 326 so that treated water can be introduced through the plurality of perforated holes 330.

Also, the other end of the first drain 326 may be connected to a distribution perforated hole pipe 370 provided in the anaerobic artificial wetland 360.

Here, the distribution perforated hole pipe 370 may be provided at the anaerobic artificial wetland 360 in a vertical direction, and a plurality of perforated holes (not shown) may be formed in an outer side of the distribution perforated hole pipe 370.

Thus, treated water transferred via the first drain 326 may be uniformly and widely discharged to one side of the anaerobic artificial wetland 360 by the distribution perforated hole pipe 370.

Figure 8:
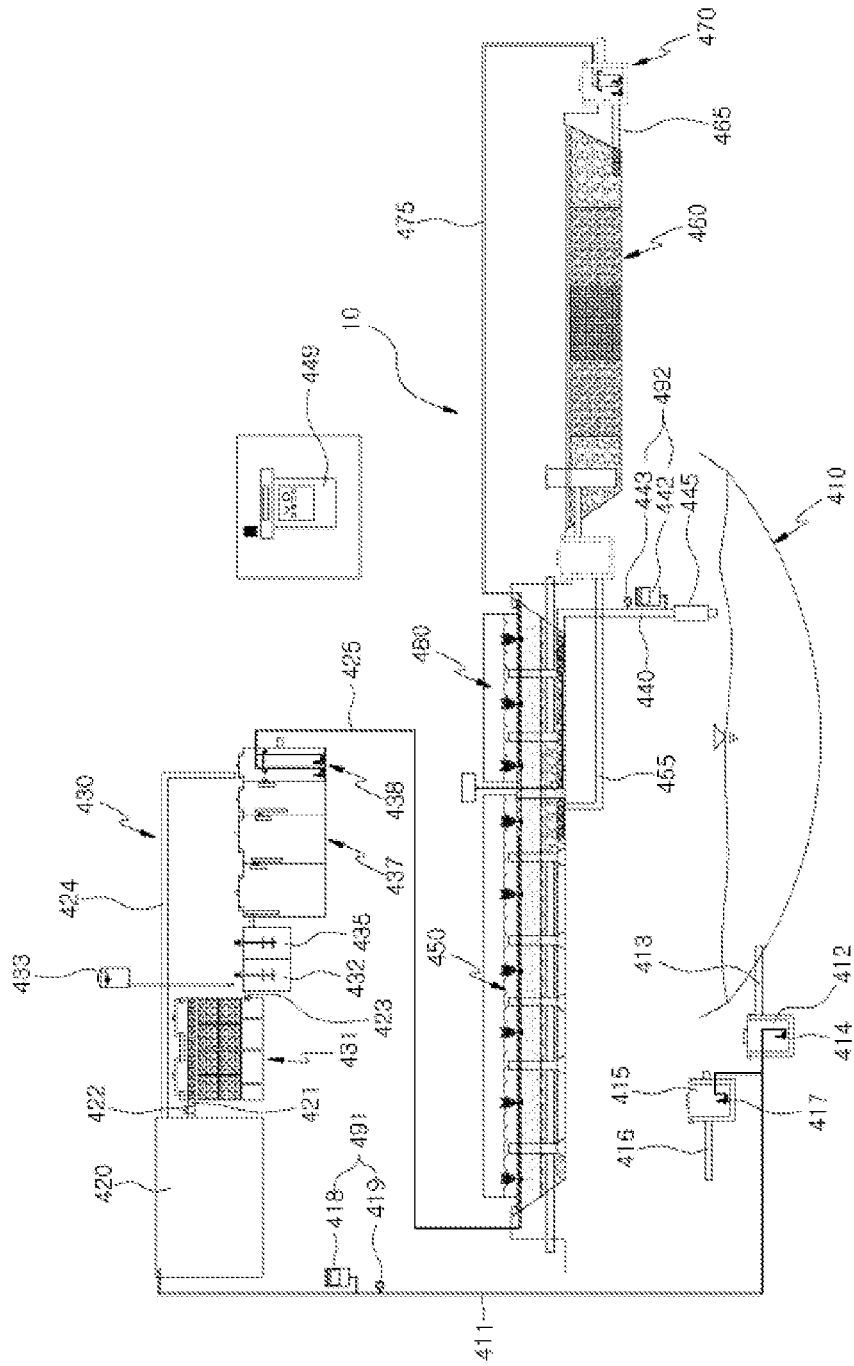
FIG. 8 is a cross-sectional view illustrating a natural nonpoint purification device capable of simultaneously purifying river and lake water using a hybrid artificial wetland water purification system according to a fourth exemplary embodiment of the present invention.
Figure 9:
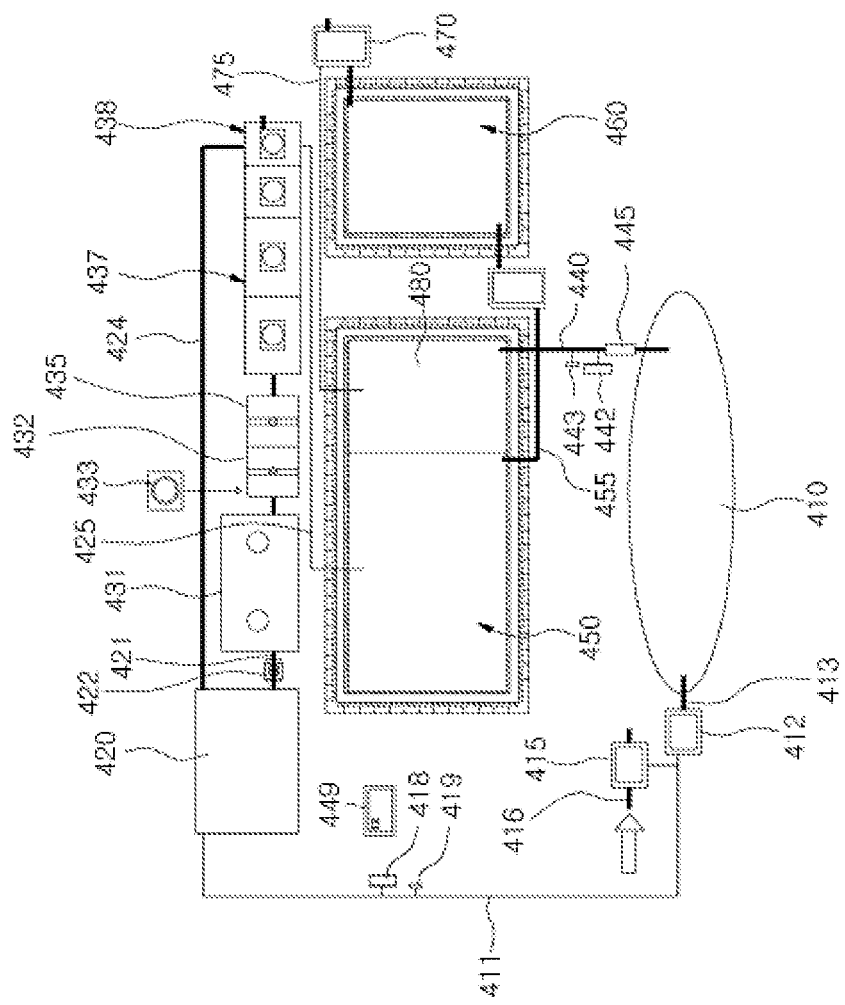
FIG. 9 is a plan view illustrating the natural nonpoint purification device capable of simultaneously purifying river and lake water using the hybrid artificial wetland water purification system according to the fourth exemplary embodiment of the present invention.

FIG. 8 is a cross-sectional view illustrating a natural nonpoint purification device capable of simultaneously purifying river and lake water using a hybrid artificial wetland water purification system according to a fourth exemplary embodiment of the present invention, and FIG. 9 is a plan view illustrating the natural nonpoint purification device capable of simultaneously purifying river and lake water using the hybrid artificial wetland water purification system according to the fourth exemplary embodiment of the present invention.

As illustrated in FIGS. 8 and 9, the natural nonpoint purification device capable of simultaneously purifying river and lake water may include a detention pond 420, a pretreatment unit 430, a hybrid artificial wetland water purification system 10, and a control device 449. Water to be purified sequentially passes through the detention pond 420, the pretreatment unit 430, and the hybrid artificial wetland water purification system 10 so that pollutants can be effectively removed and can be discharged toward a lake 410. Here, the control device 449 may analyze the quality of the introduced water to be purified and the quality of the discharged treated water in real time, and may control the flow rate of introduced water to be purified and the flow rate of the discharged treated water in real time, and may control the flow path of the treated water. Thus, nonpoint pollutants can be effectively and efficiently removed.

In further detail, the detention pond 420 may be configured in either shape of a structure buried under the ground or a pond.

Here, when the detention pond 420 has a shape of a structure buried under the ground, the structure may be a concrete structure. However, a material that may provide structural stability, such as FRP, PE, or stainless steel, can also be further used to form the structure, as needed.

Also, even when the detention pond 420 has a shape of a pond, the above-described material may be used.

Furthermore, a water-blocking layer for preventing water leakage may be further provided at an outer side part, such as a bottom part and a side part of the detention pond 420. In this case, the water-blocking layer may be formed of a HDPE material.

Also, the water-blocking layer may be formed to a thickness wherein water leakage is prevented and sufficient strength can be guaranteed. To this end, the water-blocking layer may be formed to a thickness of 1 to 2 mm.

The detention pond 420 may be installed so as to detain 0.5 to 1.0 Q of a predicted initial rain nonpoint occurrence amount.

Here, the Q (nonpoint pollution amount generated by initial rain, $m^3$) is defined as a nonpoint pollution source occurrence basin area (A, $m^2$)×rain intensity (I, mm).

The nonpoint pollution source occurrence basin area means a rain collection area (i.e., an area of rain based on a place where rain is collected in a predetermined direction and in a particular space, for example, an installation position of a purification facility) when it rains.

Also, rain intensity means an accumulated rain amount and may be calculated based on 5 to 10 mm, and in further detail, about 5 mm may be applied to the rain intensity.

Thus, the initial rain nonpoint occurrence amount may mean the occurrence amount (nonpoint contaminated water) of nonpoint pollution sources having a very high degree of contamination up to levels of about 5 mm of accumulated rain. The detention pond 420 may detain 0.5 to 1.0 Q of the initial rain nonpoint occurrence amount so that the majority of the nonpoint contaminated water having a very high degree of contamination can be detained.

An inlet pipe 411 connected to the detention pond 420 and guides water to be purified to be introduced into the detention pond 420, may be connected to the lake 410.

In this case, a lake water inlet water tank 412 may be provided at the inlet pipe 411, and the lake water inlet water tank 412 may be connected to the lake 410 via a lake water inlet 413.

Also, a lake water inlet pump 414 may be provided at the lake water inlet water tank 412 to introduce lake water from the lake 410, and the operation of the lake water inlet pump 414 may be controlled by a first operation controller (not shown).

A nonpoint inlet water tank 415 may be further provided at the inlet pipe 411, and a nonpoint inlet 416 may be provided at the nonpoint inlet water tank 415.

Also, a nonpoint inflow pump 417 may be further provided at the nonpoint inflow water tank 415 to supply nonpoint contaminated water caused by rain to the inflow pipe 411. The operation of the nonpoint inflow pump 417 may be controlled by a second operation controller (not shown).

A first analysis device 491 may be provided at the inlet pipe 411. The first analysis device 491 measures and analyzes a first measurement value in real time from water to be purified, which is introduced into the detention pond 420.

In this case, the first measurement value may include a flow rate, pH, water temperature, turbidity, oil, total organic carbon, biological toxicity, chemical oxygen demand (COD), total nitrogen, and total phosphorus of the introduced water to be purified. In order to measure the first measurement value, the first analysis device 491 may include a water quality analyzer 418 and a flowmeter 419.

Also, the inflow amount of the water to be purified and a flow path of treated water at the pretreatment unit 430 may be adjusted according to the first measurement value. To this end, the first and second operation controllers and the first analysis device 491 may be included in the control device 449. The control device 449 may further include a central controller (not shown).

The central controller may allow water to be purified to vary according to a change in the first measurement value during normal weather and rain.

The central controller controls the lake water inlet pump 414 to operate during normal weather so that lake water of the lake 410 can be introduced. The central controller controls the nonpoint inflow pump 417 to operate during rain so that nonpoint contaminated water caused by rain can be introduced.

The detention pond 420 may perform a pretreatment function, whereby precipitates and floating material, inert matter, and oily and suspension solid material can be stably removed from nonpoint pollutants of the introduced water to be purified. A function of attenuating a shock load or of effectively responding to a change in the shock load can also be performed.

The detention pond 420 may be connected to the pretreatment unit 430 via a first transfer pipe 421. Thus, treated water treated at the detention pond 420 is transferred to the pretreatment unit 430 via the first transfer pipe 421.

Figure 10:
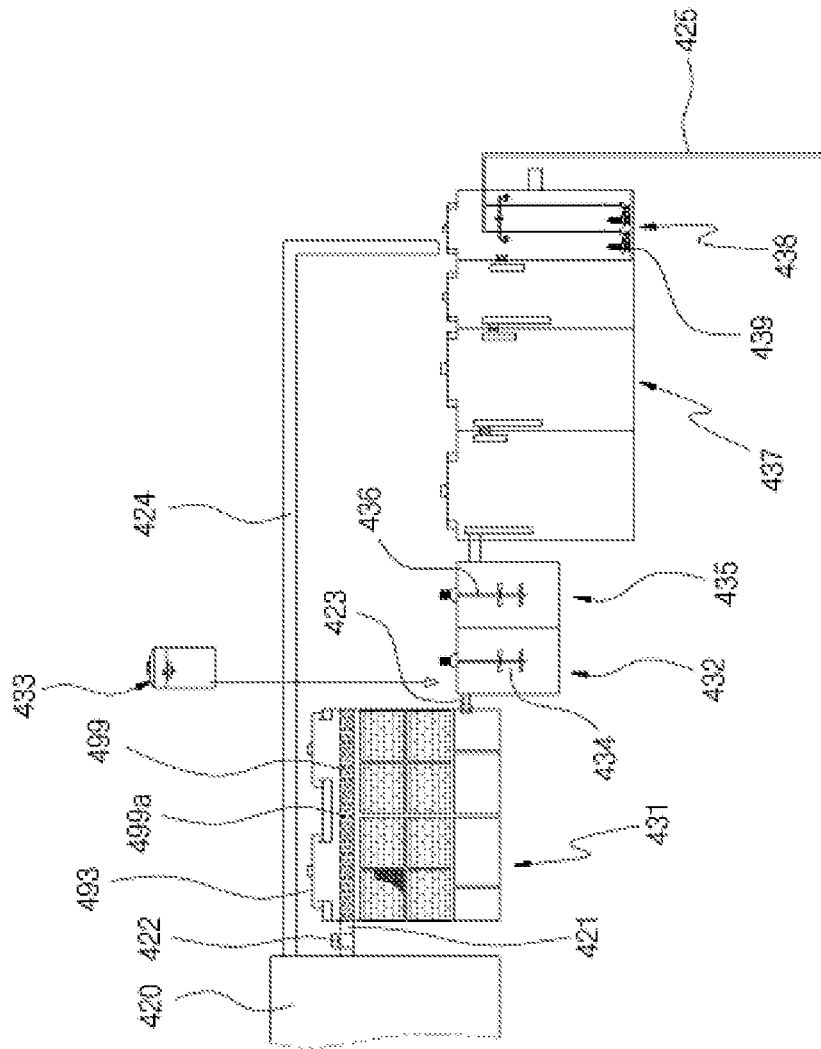
FIG. 10 is a front view illustrating a pretreatment unit of the natural nonpoint purification device capable of simultaneously purifying river and lake water using the hybrid artificial wetland water purification system according to the fourth exemplary embodiment of the present invention.
Figure 11:
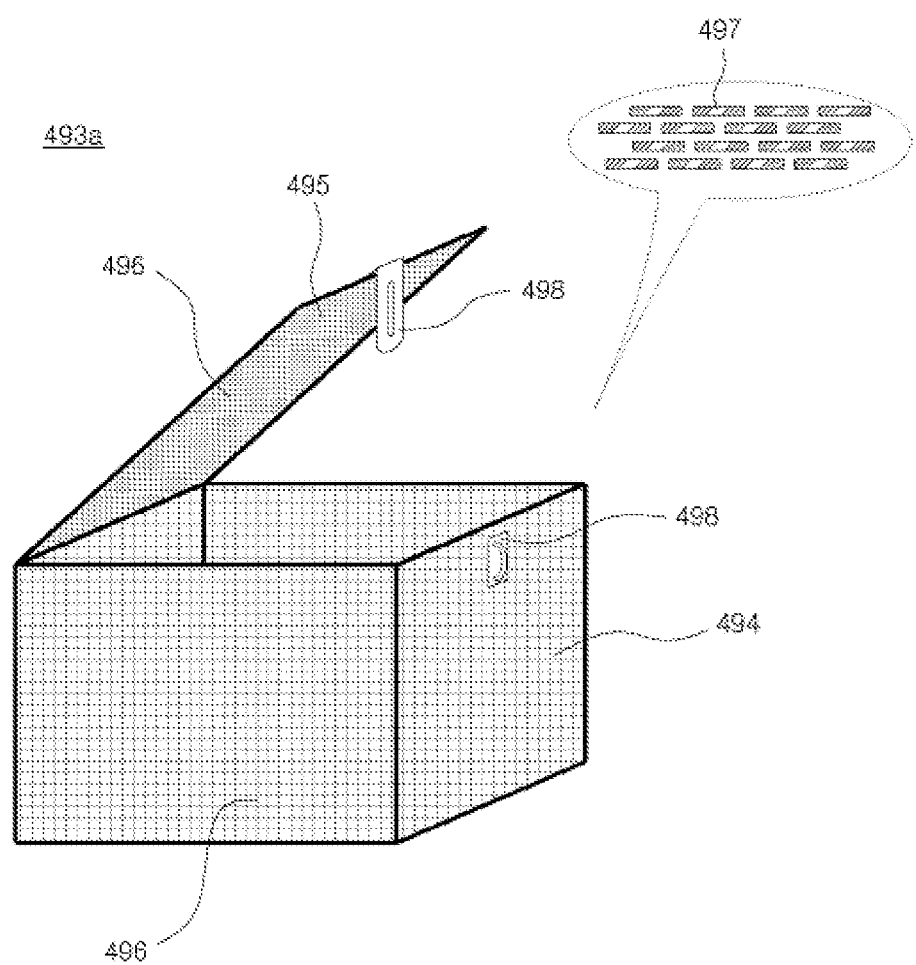
FIG. 11 illustrates a packing box of a filtering tank of the natural nonpoint purification device capable of simultaneously purifying river and lake water using the hybrid artificial wetland water purification system according to the fourth exemplary embodiment of the present invention.

FIG. 10 is a front view illustrating a pretreatment unit of the natural nonpoint purification device capable of simultaneously purifying river and lake water using the hybrid artificial wetland water purification system according to the fourth exemplary embodiment of the present invention, and FIG. 11 illustrates a packing box of a filtering tank of the natural nonpoint purification device capable of simultaneously purifying river and lake water using the hybrid artificial wetland water purification system according to the fourth exemplary embodiment of the present invention. Hereinafter, FIGS. 10 and 11 will be described.

As illustrated in FIGS. 8 through 11, the pretreatment unit 430 may include a filtering tank 431, an agitating tank 432, an agglomerating tank 435, a precipitation tank 437, and a pretreatment water tank 438.

Here, the filtering tank 431 may be connected to the detention pond 420 via the first transfer pipe 421, and a regulating valve 422 that selectively opens and closes the first transfer pipe 421 may be provided at the first transfer pipe 421.

The operation of the regulating valve 422 may be controlled by a third operation controller (not shown), and the third operation controller may be included in the control device 449.

Also, the filtering tank 431 may include a housing 493, a packing box 493a, and a distribution pipe 499.

First, the housing 493 constituting an exterior of the filtering tank 431, may be formed of a concrete material so that structural stability can be obtained, and may be treated to be watertight.

The distribution pipe 499 may be provided at an inner upper part of the housing 493. In this case, a plurality of perforating holes 499a may be formed in an outer surface of the distribution pipe 499, and the distribution pipe 499 may be connected to the first transfer pipe 421.

Thus, treated water transferred to the distribution pipe 499 from the detention pond 420 via the first transfer pipe 421 may be discharged through the perforating holes 499a.

The packing box 493a may be provided at a lower part of the distribution pipe 499 inside the housing 493. Thus, treated water discharged from the distribution pipe 499 drops toward the packing box 493a at the lower side of the distribution pipe 499.

The packing box 493a may include an accommodation part 494 and a cover part 495.

Here, the accommodation part 494 is configured in such a way that a space is formed at an inner side of the accommodation part 494. A net 496 may be formed or a plurality of holes may be formed so that treated water discharged from the perforating holes 499a of the distribution pipe 499 may pass through the accommodation part 494 and may flow.

A filtering member 497 is accommodated in an inner side of the accommodation part 494.

In this case, the filtering member 497 may be formed of a material, which may be easily replaced with low cost and in which solid material and oil can be effectively removed from introduced treated water. The filtering member 497 may be formed of a plant filtering member.

The plant filtering member may include reed chips cut to sizes of 3 to 10 cm.

The reed chips may be densely filled within the inner side of the accommodation part 494 and thus efficient accommodation is possible. Thus, additional removal of oil and soil and sand contained in treated water that passes through the detention pond 420 can be effectively performed.

The cover part 495 may be provided to open and close an upper part of the accommodation part 494. A locking device 498 may be further provided so that the cover part 495 can be fixed in a state in which it covers the upper part of the accommodation part 494.

Thus, the filtering member 497 is accommodated in the accommodation part 494 so that the filtering member 497 may not be discharged from the accommodation part 494. The filtering member 497 may be easily replaced by opening the cover part 495, as needed.

The packing box 493a may be detached from the inner side of the housing 493 so that the filtering member 497 may be easily replaced. A plurality of packing boxes 493a may be provided at the inner side of the housing 493 in consideration of the filtering amount and filtering efficiency of the treated water.

In this case, the distribution pipe 499 may be widely and uniformly provided at an upper side of each of the packing boxes 493a so that the discharged, treated water may be uniformly distributed to the packing box 493a.

The filtering tank 431 may be configured in such a way that the treated water may stay at an inner side of the filtering tank 431 for a predetermined amount of time so that the introduced, treated water can be effectively filtered. For example, the filtering tank 431 may be configured in such a way that the introduced, treated water may stay for 2 to 10 minutes.

The agitating tank 432 may be connected to the filtering tank 431 via a second transfer pipe 423 along a flow direction of the treated water introduced from the first transfer pipe 421.

Also, a medicine injection device 433 may be further connected to the second transfer pipe 423 or the agitating tank 432.

Here, a medicine may be injected by the medicine injection device 433 so that pollutants of the treated water passing through the filtering tank 431 can be agglomerated.

The operation of the medicine injection device 433 may be controlled by a fourth operation controller (not shown). The fourth operation controller may be included in the control device 449.

Also, an agitator 434 may be provided at the agitating tank 432 so that the injected medicine can be well agitated.

In this case, the agitator 434 may be rotated at 120 to 150 rpm.

Also, the agglomerating tank 435 may be provided at one side of the agitating tank 432. An agglomerating device 436, for inducing agglomeration of the injected medicine, may be provided at the agglomerating tank 435.

In this case, the agglomerating device 436 may be rotated at 20 to 70 rpm.

The precipitation tank 437 may be connected to one side of the agglomerating tank 435, and an agglomerated byproduct is precipitated at the precipitation tank 437 while passing through the agglomerating tank 435.

Also, the pretreatment water tank 438, that allows the treated water passing through the precipitation tank 437 to be collected, may be provided at one side of the precipitation tank 437.

A direct guide pipe 424 may be further connected to an upper side of the first transfer pipe 421 at the detention pond 420.

In this case, the direct guide pipe 424 may be provided such that the treated water may flow naturally via gravity and may be connected to the pretreatment water tank 438.

Thus, the treated water detained in the detention pond 420 may flow directly to the pretreatment water tank 438 via the direct guide pipe 424.

If the regulating valve 422 is sealed by the third operation controller, the treated water of the detention pond 420 may move directly to the pretreatment water tank 438 via the direct guide pipe 424.

If the regulating valve 422 is opened by the third operation controller, the treated water of the detention pond 420 may flow to the filtering tank 431 via the first transfer pipe 421.

The flow of the treated water may be controlled by the central controller. For example, in at least one case among cases where deterioration of water quality measured by the first measurement value is severe (i.e., where the water quality measured by the first measurement value is greater than or equal to a reference value) during rain, and where deterioration of water quality measured by a second measurement value that will be described below is severe (i.e., where the water quality measured by the second measurement value is greater than or equal to a reference value) the regulating valve 422 may be opened.

Thus, the treated water discharged from the detention pond 420 passes through the filtering tank 431, the agitating tank 432, the agglomerating tank 435, the precipitation tank 437, and the pretreatment water tank 438, thereby passing through all portions of the pretreatment unit 430 and being purified.

However, in at least one case among cases where the water quality measured by the first measurement value is not severely deteriorated (i.e., where the water quality measured by the first measurement value is less than or equal to a reference value) during normal weather, and where deterioration of water quality measured by the second measurement value that will be described below is not severe (i.e., where the water quality measured by the second measurement value is less than or equal to a reference value) the regulating valve 422 may be sealed. Thus, the treated water may flow directly to the pretreatment water tank 438 without undergoing unnecessary purification processes.

The hybrid artificial wetland water purification system 10 is provided at one side of the pretreatment water tank 438. The configuration of the hybrid artificial wetland water purification system 10 is the same as that of the first embodiment, and thus detailed descriptions thereof will be omitted.

The pretreatment water tank 438 and a first aerobic artificial wetland 450 may be connected to each other by a third transfer pipe 425.

A first pump 439 may be provided at the pretreatment water tank 438. The treated water of the pretreatment water tank 438 may be discharged by the first pump 439 to the first aerobic artificial wetland 450 via the third transfer pipe 425 in a quantitative manner.

Meanwhile, the treated water discharged from the first aerobic artificial wetland 450 may move to an anaerobic artificial wetland 460 via a first drain 455, and the anaerobic artificial wetland 460 may be connected to a second water tank 470 via a second drain 465.

One end of a third drain 475 may be connected to the second water tank 470, and the other end of the third drain 475 may be connected to a second aerobic artificial wetland 480.

One end of a discharge pipe 440 may be provided in the vicinity of the bottom part of the second aerobic artificial wetland 480, and the other end of the discharge pipe 440 may be connected to the lake 410.

A second analysis device 492 may be provided at the discharge pipe 440. The second analysis device 492 may measure a second measurement value from the treated water discharged through the discharge pipe 440.

In this case, the second measurement value may include a flow rate, pH, water temperature, turbidity, oil, total organic carbon, biological toxicity, chemical oxygen demand (COD), total nitrogen, and total phosphorus of the discharged, treated water. In order to measure the second measurement value, the second analysis device 492 may include a water quality analyzer 442 and a flowmeter 443.

Thus, the state of the treated water discharged from the second aerobic artificial wetland 480 may be checked.

A sterilization device 445 may be further provided at the discharge pipe 440.

Here, the sterilization device 445 may be a device using ultraviolet rays.

The sterilization device 445 may be controlled by a fifth operation controller (not shown). The fifth operation controller may be included in the control device 449.

The central controller may control the flow rate of water to be purified, which is introduced into the detention pond 420, and the flow rate of treated water discharged from the second aerobic artificial wetland 480 according to the flow rate and water quality measured by the second analysis device 492 in real time.

In this way, the control device 449 may measure, analyze, and monitor flow rates and water quality of introduced water to be purified and discharged, treated water in real time, and may allow lake water to be introduced during normal weather, and may allow nonpoint contaminated water caused by rain to be introduced during rain.

In this case, the central controller may control the lake water inlet pump 414 to operate so that lake water may be introduced as water to be purified, and may stop the operation of the lake water inlet pump 414 to then control the nonpoint inflow pump 417 to operate so that nonpoint contaminated water caused by rain may be introduced as water to be purified.

When nonpoint contaminated water caused by rain is introduced, the regulating valve 422 is opened so that the treated water may pass through all portions of the pretreatment unit 430, and desired water quality can be obtained.

Also, when lake water is introduced, the regulating valve 422 is sealed so that the treated water may flow directly into the pretreatment water tank 430(438) and the purification time can be reduced without undergoing unnecessary purification processes and unnecessary operations are prevented to improve maintenance and economical efficiency.

Figure 12:
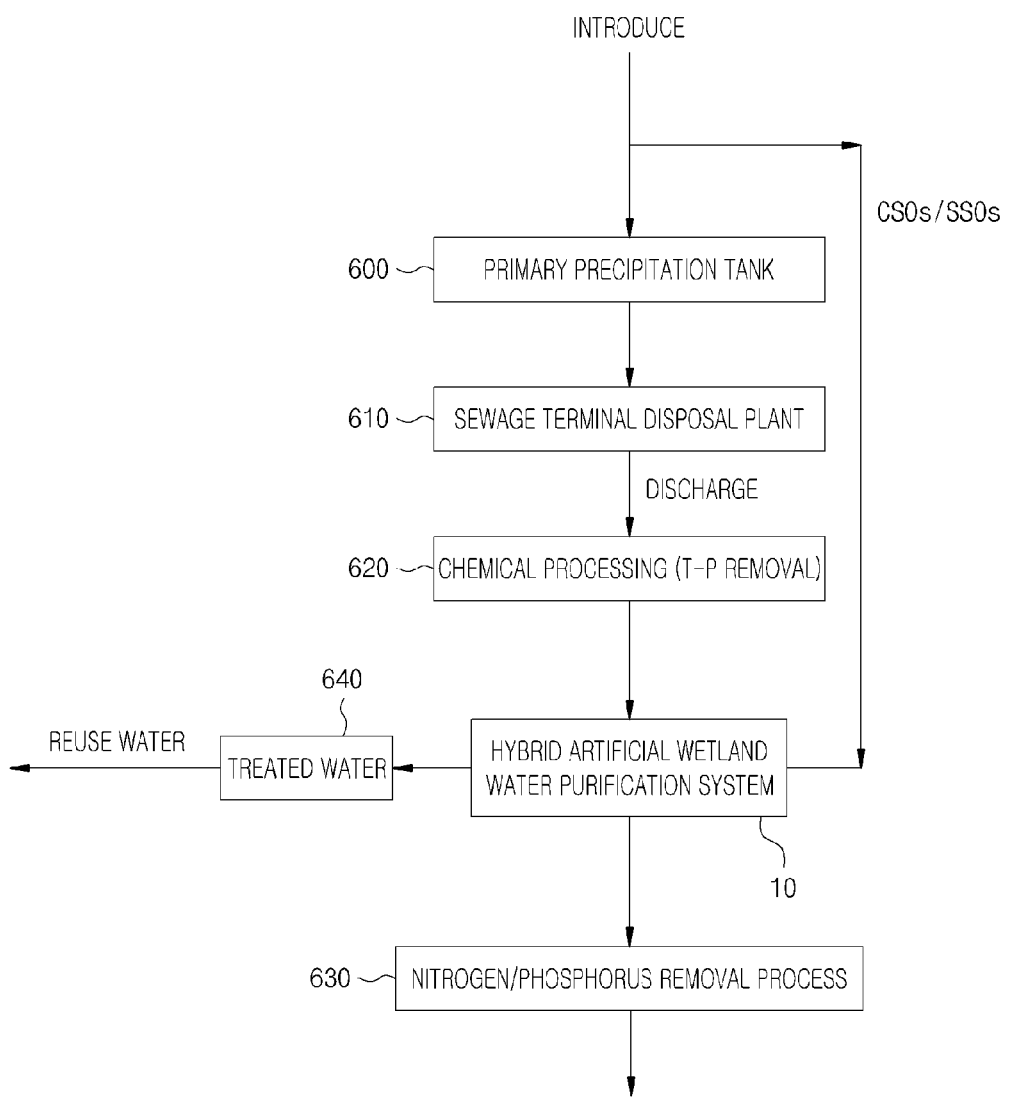
FIG. 12 is a flowchart illustrating a reuse facility using a hybrid artificial wetland water purification system according to a fifth exemplary embodiment of the present invention.

FIG. 12 is a flowchart illustrating a reuse facility using a hybrid artificial wetland water purification system according to a fifth exemplary embodiment of the present invention.

As illustrated in FIG. 12, the hybrid artificial wetland water purification system 10 may be used as third treatment and reuse facility of sewage.

For example, after treated water is introduced into a primary precipitation tank 600 and passes through a sewage terminal disposal plant 610 and is then discharged, the treated water that undergoes chemical processing 620, in which total phosphorus (T-P) is controlled, may then pass through the hybrid artificial wetland water purification system 10.

Subsequently, the treated water discharged from the hybrid artificial wetland water purification system 10 may be discharged through a nitrogen/phosphorus removal process 630, or other treated water 640 may be utilized as reuse water.

In this case, combined sewer overflows (CSOs) of a combined sewer system before being introduced into the primary precipitation tank 600 may be introduced directly into the hybrid artificial wetland water purification system 10.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A hybrid artificial wetland water purification system, comprising:
   a first aerobic artificial wetland that induces a vertical flow of introduced water, which is to be purified, and allows pollutants to be removed;
   an anaerobic artificial wetland that induces a horizontal flow of treated water which is introduced from the first aerobic artificial wetland, and allows pollutants to be further removed; and
   a second aerobic artificial wetland that induces a vertical flow of treated water which is introduced from the anaerobic artificial wetland, and allows air to be supplied inwardly such that the amount of dissolved oxygen of the introduced treated water increases.

2. The hybrid artificial wetland water purification system of claim 1, wherein the first aerobic artificial wetland comprises:
   a first filtering layer comprising aggregate stacked from a bottom surface blocked so that water leakage is capable of being prevented and a first medium provided at an upper part of the aggregate;

a first reed chip layer provided at an upper part of the first filtering layer;

a first distribution device that allows treated water supplied when water to be purified is treated, to be uniformly dispersed into an upper part of the first reed chip layer;

a first air introduction tube that allows air to be introduced into the first filtering layer; and a first air supply unit that is connected to one end of the first air introduction tube and allows introduced air to be dispersed into an inner side of the first filtering layer.

3. The hybrid artificial wetland water purification system of claim 2, wherein the first air introduction tube is provided in a vertical direction and allows atmospheric air to be introduced into a top end of the first air introduction tube, to move to a lower side of the first air introduction tube, and to be discharged to a bottom end of the first air introduction tube, and the first air supply unit is disposed on the first filtering layer in a horizontal direction, and a connection hole formed in an upper part of the first air supply unit is connected to a bottom end of the first air introduction tube, and the first air supply unit comprises a plurality of tunnel type perforated drainpipes each having an outer surface in which through holes are formed, so that air introduced from the first air introduction tube is capable of being supplied to the first filtering layer.

4. The hybrid artificial wetland water purification system of claim 3, wherein the plurality of tunnel type perforated drainpipes are disposed on a bottom surface of the first filtering layer, guide inner space parts to communicate with each other, and guide treated water to move, and a plurality of first air introduction tubes are provided to be spaced apart from each other by a predetermined distance.

5. The hybrid artificial wetland water purification system of claim 1, wherein the anaerobic artificial wetland comprises:

a second filtering layer that is provided on a bottom surface from which water is blocked so that water leakage is capable of being prevented, wherein a first aggregate part, a second aggregate part, a third aggregate part, the second aggregate part, and the first aggregate part are sequentially provided from the front to the rear along a flow direction of treated water and sizes of aggregates are large in an order of the first aggregate part, the second aggregate part, and the third aggregate part; and a second medium overall installed at an upper part of the second filtering layer.

6. The hybrid artificial wetland water purification system of claim 1, wherein the second aerobic artificial wetland comprises:

a third filtering layer comprising aggregate stacked from a bottom surface blocked so that water leakage is capable of being prevented and a third medium provided at an upper part of the aggregate;

a second reed chip layer provided at an upper part of the third filtering layer;

a second distribution device that allows treated water supplied when water to be purified is treated, to be uniformly dispersed into an upper part of the second reed chip layer;

a second air introduction tube that allows air to be introduced into the third filtering layer; and a second air supply unit that is connected to one end of the second air introduction tube and allows introduced air to be dispersed into an inner side of the third filtering layer.

7. The hybrid artificial wetland water purification system of claim 6, wherein the second air introduction tube is provided in a vertical direction and allows atmospheric air to be introduced into a top end of the second air introduction tube, to move to a lower side of the first air introduction tube, and to be discharged to a bottom end of the second air introduction tube, and the second air supply unit is disposed on the third filtering layer in a horizontal direction, and a connection hole formed in an upper part of the second air supply unit is connected to a bottom end of the second air introduction tube, and the second air supply unit comprises a plurality of tunnel type perforated drainpipes each having an outer surface in which through holes are formed, so that air introduced from the second air introduction tube is capable of being supplied to the third filtering layer.

8. The hybrid artificial wetland water purification system of claim 7, wherein the plurality of tunnel type perforated drainpipes are disposed on a bottom surface of the third filtering layer, guide inner space parts to communicate with each other, and guide treated water to move, and a plurality of second air introduction tubes are provided to be spaced apart from each other by a predetermined distance.

9. A sewage treatment device, comprising:

a water-collecting tank comprising:
 a screen tank in which water to be purified is collected, the screen tank having a screen to filter an object to be purified that exists in sewage; and
 a precipitation tank connected to one side of the screen tank to precipitate the object to be purified which is not filtered from the screen tank;

the hybrid artificial wetland water purification system of claim 1 provided to treat the treated water discharged from the water-collecting tank; and a discharge tank which is disposed at one side of a second aerobic artificial wetland of the hybrid artificial wetland water purification system, the discharge tank collecting and discharging the treated water purified through the second aerobic artificial wetland is collected and discharged to the outside.

10. A natural nonpoint purification device, comprising:

a detention pond, which is configured of either one of a structure installed under the ground and a pond installed on an earth's surface, to detain water to be purified, the detention pond having an outer surface on which a water-blocking layer is provided so that water leakage is prevented, the detention pond having an inlet and an introduction water door through which the water to be purified is introduced, the introduction water door provided at an inlet and operated according to a first measurement value;

a pretreatment unit in which the treated water treated in the detention pond is introduced and pretreated;

the hybrid artificial wetland water purification system of claim 1 provided to treat treated water discharged from the pretreatment unit; and a control device that obtains a first measurement value of water to be purified introduced into the detention pond in real time, controls an inflow amount of the water to be purified in real time, obtains a second measurement value of the treated water that is finally discharged from the second aerobic artificial wetland in real time, and controls a discharge amount of the treated water in real time.

11. The natural nonpoint purification device of claim 10, wherein the detention pond is installed so as to detain 0.5 to 1.0 Q of a predicted initial rain nonpoint occurrence amount, where the Q (nonpoint pollution amount generated by initial rain, $m^3$) is defined as a nonpoint pollution source occurrence basin area (A, $m^2$)×rain intensity (I, mm).

12. The natural nonpoint purification device of claim 10, wherein the pretreatment unit comprises a filtering tank, an agitating tank, an agglomerating tank, a precipitation tank, and a pretreatment water tank, which are sequentially provided along a flow direction of treated water supplied from the detention pond, and the filtering tank comprises:
- a housing that constitutes an exterior and that is watertight treated;
- a packing box comprising an accommodation part in which a plant filtering member is filled and a cover part that opens and closes an upper part of the accommodation part, the packing box being detached from an inner side of the housing; and
- a distribution pipe, which is provided at an upper side of the packing box and has an outer surface in which a plurality of perforating holes are formed and treated water transferred from the detention pond is distributed toward the packing box through the plurality of perforating holes.

13. The natural nonpoint purification device of claim 12, wherein, at the detention pond, a first transfer pipe in which nonpoint contaminated water caused by introduced rain is guided to the distribution pipe and allowed to move sequentially along the filtering tank, the agitating tank, the agglomerating tank, the precipitation tank, and the pretreatment water tank, and a direct guide pipe that guides introduced water to move directly to the pretreatment water tank, are connected to each other.

14. The natural nonpoint purification device of claim 10, wherein the second aerobic artificial wetland further comprises a discharge pipe that guides discharged, treated water to be discharged toward river or lake water.

* * * * *